United States Patent
Schmidt et al.

(10) Patent No.: US 11,208,551 B2
(45) Date of Patent: Dec. 28, 2021

(54) POLYMER COMPOSITION CONTAINING PLLA AND PDLA

(71) Applicant: BIO-TEC BIOLOGISCHE NATURVERPACKUNGEN GMBH & CO. KG, Emmerich (DE)

(72) Inventors: Harald Schmidt, Emmerich (DE); Christoph Hess, Rees (DE); Wolfgang Friedek, Bedburg-Hau (DE); Ralph Beckmann, Rheine (DE)

(73) Assignee: BIO-TEC BIOLOGISCHE NATURVERPACKUNGEN GMBH & CO. KG, Emmerich (DE)

( * ) Notice: Subject to any disclaimer, the term of this patent is extended or adjusted under 35 U.S.C. 154(b) by 200 days.

(21) Appl. No.: 15/115,798

(22) PCT Filed: Feb. 2, 2015

(86) PCT No.: PCT/EP2015/052029
§ 371 (c)(1),
(2) Date: Aug. 1, 2016

(87) PCT Pub. No.: WO2015/114126
PCT Pub. Date: Aug. 6, 2015

(65) Prior Publication Data
US 2017/0037241 A1 Feb. 9, 2017

(30) Foreign Application Priority Data
Jan. 31, 2014 (DE) .................. 10 2014 001 152.6

(51) Int. Cl.
*B32B 27/08* (2006.01)
*C08L 67/04* (2006.01)
*C08L 67/02* (2006.01)
*C08K 3/013* (2018.01)
*B65D 65/46* (2006.01)
*B65D 85/804* (2006.01)

(52) U.S. Cl.
CPC ............ *C08L 67/04* (2013.01); *B65D 65/466* (2013.01); *B65D 85/8043* (2013.01);
(Continued)

(58) Field of Classification Search
CPC ...................................................... C08L 67/04
See application file for complete search history.

(56) References Cited

U.S. PATENT DOCUMENTS

2005/0250931 A1* 11/2005 Takagi ..................... C08J 11/12
528/310
2009/0186178 A1* 7/2009 Ito ........................ B29C 49/0005
428/35.7
2010/0227963 A1* 9/2010 Hironaka ................ C08L 23/02
524/451

FOREIGN PATENT DOCUMENTS

EP 1983030 10/2008
EP 1983030 A1 10/2008
(Continued)

OTHER PUBLICATIONS

Ecoflex Datasheet, BASF, Retrieved Oct. 24, 2018 from https://www.plasticsportal.net/wa/plasticsEU~en_GB/function/conversions/publish/common/upload/biodegradable_plastics/Ecoflex_F_Blend_C1200.pdf (Year: 2013).*

(Continued)

*Primary Examiner* — Zachary M Davis
(74) *Attorney, Agent, or Firm* — Workman Nydegger

(57) ABSTRACT

A polymer composition is presented and described and includes, based on the total weight of the polymer composition, the following components: a. from 15 to 70% by weight of PLLA, b. from 0.1 to 15% by weight of PDLA, c. from 5 to 40% by weight of polyester, and d. from 5 to 40% by weight of organic or inorganic filler. These polymer compositions can be biodegradable, comprise mainly biobased carbon, and have an increased heat deflection tem- (Continued)

perature. These polymer compositions can moreover be used in specific processes in order to produce molded parts, films, or fibers which by virtue of their high heat deflection temperature can also be used as containers for coffee-preparation systems.

27 Claims, 3 Drawing Sheets

(52) U.S. Cl.
CPC .............. *C08K 3/013* (2018.01); *C08L 67/02* (2013.01); *C08L 2201/08* (2013.01); *C08L 2205/02* (2013.01); *C08L 2205/025* (2013.01); *C08L 2205/03* (2013.01)

(56) References Cited

FOREIGN PATENT DOCUMENTS

| | | | |
|---|---|---|---|
| EP | 2025703 | 2/2009 | |
| EP | 2025703 A1 | 2/2009 | |
| EP | 2583994 A1 * | 4/2013 | .............. C08L 67/04 |
| JP | 2003128900 | 5/2003 | |
| WO | WO2012120309 | 3/2012 | |
| WO | 2013062412 | 5/2013 | |
| WO | WO2013062412 | 5/2013 | |
| WO | WO2013131649 | 9/2013 | |

OTHER PUBLICATIONS

Schmidt et al., "Polylactide Stereocomplex Crystallites as Nucleating Agents for Isotactic Polylactide", 2001, Journal of Polymer Science: Part B: Polymer Physics, John Wiley & Sons, vol. 39, pp. 300-313 (Year: 2001).*

International Search Report cited in PCT Application No. PCT/EP2015/052029 dated Apr. 20, 2015.

International Preliminary Report on Patentability dated Aug. 11, 2016, issued in PCT Application No. PCT/EP2015/052029, filed Feb. 2, 2015.

European Search Report cited in EP20212469 dated Jul. 13, 2021.

Database WPI, Week 200379, Thomson Scientific, London, GB; AN 2003-847383, XP002738206, & JP 2003 128900 A (Mitsubishi Plastics Ind Ltd) May 8, 2003.

* cited by examiner

POLYMER COMPOSITION CONTAINING PLLA AND PDLA

The invention relates to a polymer composition, and also to a process for production thereof. The invention further relates to the use of the polymer composition in a process for producing films, molded parts, or fibers made of the polymer composition, and also to products of this type which comprise the polymer composition of the invention.

With a view to conservation in respect of fossil resources and waste disposal, and reduction of $CO_2$ emissions, it is desirable that the conventional plastics widely used, based on fossil feedstock sources, be replaced by plastics which can be obtained at least to some extent, or entirely, from renewable feedstocks. Polymers which are based to some extent or entirely on renewable feedstocks are also termed "biobased" polymers.

Biodegradable plastics are not necessarily also biobased: there are some biodegradable plastics that are derived from fossil, non-renewable resources. Biodegradability is not determined by the underlying feedstock, but instead depends solely on the chemical structure of the material and on its ability to become converted by biological activity into naturally occurring metabolites.

By now, there are now some polymer compositions available that are both fully biodegradable and biobased. A thermoplastic polymer composition of this type which is in particular suitable for blown-film extrusion, flat-film extrusion, and for injection-molding fully biodegradable products is commercially obtainable with the trademark "BIO-PLAST® 500" from BIOTEC GmbH & Co. KG in Emmerich (Germany).

In order to amplify the possible uses of fully biodegradable, biobased polymer compositions an increased heat resistance of the films, molded parts, or fibers obtainable from the plastics is desirable.

Many foods are packaged at temperatures above 70° C. Examples that may be mentioned here are hot drinks such as coffee or tea, but also savory sauces such as ketchup. The latter are also simultaneously pasteurized by the hot-packaging process.

Containers used hitherto for these hot foods have mostly been made of plastics based on polystyrene or polypropylene. Although these plastics have sufficiently high heat resistance, they are neither biodegradable nor biobased. On the other hand, most of the biodegradable, biobased plastics currently available do not have sufficiently high heat resistance to permit use for these purposes.

A polymer frequently used in biodegradable, biobased plastics is polylactic acid (PLA). PLA is a polymer composed of lactic acid monomers, and can, as a function of its composition, be amorphous, semicrystalline, or crystalline. There are two different lactic acid monomers which are stereoisomers of one another: D-lactic acid monomer and L-lactic acid monomer. PLA usually comprises both D- and L-lactic acid monomers, and the ratio of these two monomers in PLA has a decisive effect on its properties. By virtue of its glass transition temperature, about 55° C., PLA softens rapidly at temperatures above 55° C., which has a disadvantageous effect on its use at these temperatures for producing molded parts, e.g. in injection-molding processes. Compositions based on PLA likewise have low heat resistance, but as the degree of crystallinity of PLA increases this can extend significantly beyond the glass transition temperature of PLA. PLA-based compositions with a high degree of crystallinity of the PLA can therefore be used for at most about 5 minutes at temperatures above their glass transition temperature. However, a point requiring consideration is that crystallization of PLA is a slow process which moreover requires that PLA be heated, and this creates difficulties for the commercial use of PLA.

The prior art discloses various processes for increasing the degree of crystallinity of PLA and for accelerating its crystallization. One process that is now used consists in the use of mixtures of two different types of PLA respectively composed of at least 95% of L-lactic acid monomers or D-lactic acid monomers. These two types are accordingly known as poly(L-lactic acid) (PLLA) and poly(D-lactic acid) (PDLA). It is known that in mixtures of PLLA and PDLA these form specific, three-dimensional stereocomplexes, resulting in extremely stable crystals with melting points significantly above 200° C.

EP 2 116 575 A1 describes the production of PDLA/PLLA mixtures in a preferred ratio of 40% by weight to 60% by weight up to 60% by weight to 40% by weight in order to provide a high degree of formation of stereo-complexes with a high melting point, but this leads to expensive polymer compositions, because PDLA is expensive.

US 2008/0097074 A1 describes the production of PDLA/PLLA mixtures which lead to a high degree of formation of stereocomplexes with high melting point due to addition of a urea-based nucleating agent. US 2008/0097074 A1 particularly preferably uses PLLA and PDLA in a ratio of from 40% by weight to 60% by weight up to 60% by weight to 40% by weight, but this leads to expensive polymer compositions because PDLA is expensive. It is moreover necessary to use a very specific nucleating agent.

WO 2013/062412 A2 likewise describes the production of PDLA/PLLA mixtures which have a high degree of stereocomplexes and a high melting point, and also increased heat resistance. However, no further detail is provided about the ratio of PDLA to PLLA.

A feature common to the compositions known in the prior art is that either they use very high PDLA content or the ratio of PDLA to PLLA is not stated. The compositions described in the prior art are moreover composed almost exclusively of PDLA and PLLA, which are expensive feedstocks.

Starting from the prior art explained above, it was an object of the invention to provide an inexpensive and/or biodegradable polymer composition based on polylactic acid. The polymer composition is preferably intended to permit production of molded parts, films, or fibers in a manner that is simple and/or cost-effective. The production method preferably involves cost-effective processes. The molded parts, films, or fibers made of the polymer composition preferably have a high heat deflection temperature in accordance with DIN EN ISO 75, method B. Another object of the invention was to provide a polymer composition which is produced to a major extent from renewable feedstocks. It is preferable that the polymer composition possesses all of the abovementioned features together.

This object is achieved in the invention via the polymer composition stated in claims 1 and 16, the process stated in claim 14, the process stated in claim 17, the use stated in claim 20, and also the products mentioned in claim 21.

Advantageous embodiments of the invention are stated in the dependent claims, and are explained below in detail, together with the general concept of the invention.

The polymer composition of the invention comprises, based on the total weight of the polymer composition, the following components:
 a. from 15 to 70% by weight of PLLA,
 b. from 0.1 to 15% by weight of PDLA,
 c. from 5 to 40% by weight of polyester,
 d. from 5 to 40% by weight of organic or inorganic filler.

An essential feature of the polymer composition of the invention is use of a small proportion of PDLA of from 0.1 to 15% by weight in conjunction with from 5 to 40% by weight of a polyester and from 5 to 40% by weight of an organic or inorganic filler. Surprisingly, it has been found that use of small quantities of PDLA in the polymer composition of the invention together with a polyester and an organic or inorganic filler is sufficient to obtain a polymer composition which has a high heat deflection temperature in accordance with DIN EN ISO 75, method B and/or is biodegradable and/or is composed mainly of biobased carbon and/or has good mechanical properties.

Without being bound to any particular scientific theory, it appears that even the addition of a small quantity of PDLA in combination with a polyester and a filler leads to substantial crystallization of the polylactic acid with formation of a large number of stereocomplexes with high melting point. Polymer compositions of the invention can also be used for tasks where the prevailing temperatures are above 55° C. The effect that even a small quantity of PDLA in conjunction with a polyester and a filler leads to polymer compositions with high heat deflection temperature is surprising because the prior art especially discloses compositions with high PDLA content.

According to the invention the polymer composition comprises, based on the total quantity of the PDLA and PLLA components present in the polymer composition, from 3 to 20% by weight of PDLA, preferably from 5 to 15% by weight. The small proportion of PDLA reduces the costs of the polymer composition while retaining a good heat deflection temperature and/or good mechanical properties. If less than 3% by weight of PDLA, based on the total quantity of the PDLA and PLLA components present in the polymer composition, is used, crystallization is inadequate, and if more than 20% by weight is used the polymer composition becomes difficult to process.

It is particularly preferable that the polymer composition comprises, based on the total quantity of the components PDLA and PLLA present in the polymer composition, from 7 to 13% by weight of PDLA. It has been found that these quantities of PDLA, in relation to the total quantity of PDLA and PLLA, give polymer compositions which can be further processed with particularly good results. In particular, with polymer compositions of this type it is possible to achieve short cycle times in the injection-molding process while retaining good results for heat deflection temperature.

As explained in the introduction, the purity of the PLLA and PDLA components is determined via the content of L-lactic acid monomers (for PLLA) or D-lactic acid monomers (for PDLA). According to the invention the PLLA component preferably comprises at least 90% of L-lactic acid monomers. Ideal results are obtained when the PLLA component comprises at least 94%, in particular at least 98% or 99%, of L-lactic acid monomers. The PDLA component in the invention preferably comprises at least 90% of D-lactic acid monomers. Ideal results are obtained when the PDLA component comprises at least 94%, in particular at least 98% or 99%, of D-lactic acid monomers.

In another embodiment of the invention, the polymer composition comprises, based on the total weight of the polymer composition, from 25 to 65% by weight, preferably from 35 to 60% by weight, more preferably from 45 to 60% by weight, of PLLA. Experiments have shown that when less than 15% by weight of PLLA, based on the total weight of the polymer composition, is used a material with inadequate heat deflection temperature is obtained, and when more than 70% by weight, based on the total weight of the polymer composition, is used the resultant material is too brittle for most practical applications.

The polymer composition in the invention comprises, based on the total weight of the polymer composition, from 5 to 35% by weight, preferably from 15 to 25% by weight, of an organic or inorganic filler.

Preferred inorganic or organic fillers of the invention are selected from the group consisting of chalk, lime, talc, calcium carbonate, titanium dioxide, aluminum oxide, magnesium oxide, silicates, kaolin, dolomite, boron nitride, terbium oxide, starch, modified starch, thermoplastic starch, cellulose, cyclodextrins, saccharin, thymine, uracil, orotic acid, cyanuric acid, polyvinyl alcohol, polyhydroxyalkanoates, polyhydroxybutyrate, polybutylene succinate, polybutylene terephthalate, Ecoflex® (a blend of polylactic acid, cellulose, lignin, starch, and polyhydroxyalkanoate), and mixtures thereof.

In another, advantageous embodiment of the invention, the polymer composition comprises, based on the total weight of the polymer composition, from 5 to 35% by weight, preferably from 10 to 30% by weight, more preferably from 15 to 25% by weight, of a polyester.

According to the invention it is also possible to use copolyesters as polyesters, examples being alternating and statistical copolyesters, block copolyesters, graft copolyesters, and other copolyesters.

Polyesters that can be used for the polymer composition of the invention are in particular those based on dicarboxylic acids, in particular those having in each case from 2 to 36, preferably from 4 to 18, carbon atoms in the carbon skeleton, or ester-forming derivatives thereof. The carbon skeleton here can comprise linear or branched alkyl chains, cyclic and/or aromatic systems. Examples of dicarboxylic acids of this type are 1,4-cyclohexanedicarboxylic acid, succinic acid, adipic acid, sebacic acid, azelaic acid, decanedicarboxylic acid, dimer fatty acids, phthalic acid, isophthalic acid, naphthalenedicarboxylic acid, terephthalic acid, and in particular ester-forming derivatives of terephthalic acid, and mixtures thereof.

The diol component is composed of alkanediols having from 2 to 12 C atoms in the carbon chain. Preference is given here to ethylene glycol, 1,3-propanediol, 1,4-butanediol, and 1,6-hexanediol. Alkenediols having from 4 to 12 C atoms are also used in the carbon chain. Preference is given to 1,4-butenediol, pent-2-ene-1,5-diol, and 3-methyl-2-pentene-1,5-diol. It is also possible, however, that other diols are comprised, such as neopentyl glycol, 1,4- or 1,3-dimethylolcyclohexane, or a mixture of these.

In another embodiment of the invention, the polyester is an ester based on succinic acid and/or adipic acid and 1,4-butanediol.

In an embodiment of the invention to which further preference is given, the polyester is a statistical copolyester based on at least adipic or sebacic acid. In a more preferred embodiment of the invention, the polyester is a statistical aliphatic-aromatic copolyester based on 1,4-butanediol, adipic acid, and/or sebacic acid, and terephthalic acid or a terephthalic acid derivative, in particular dimethyl terephthalate DMT. The glass transition temperature of said copolyester can in particular be from −25 to −40° C., in particular from −30 to −35° C., and/or its melting range can be from 100 to 120° C., in particular from 105 to 115° C.

In another embodiment of the invention, the polymer composition comprises, in accordance with ASTM 6866, at least 40%, preferably 50%, more preferably 60%, of biobased carbon.

The polymer composition in the invention is biodegradable in accordance with EN 13432, preferably fully biodegradable.

The particular thermal properties of the polymer composition of the invention can be demonstrated very successfully by means of differential scanning calorimetry, DSC. If a polymer sample is subjected to a defined heating/cooling program, phase transitions associated with conversion of energy (glass transition, crystallization, melting, etc.) are indicated in the form of exothermic (e.g. crystallization) or endothermic (e.g. melting) peaks in DSC diagrams. A requirement for the appearance of a peak during DSC measurement is therefore that the phase transition occurs during the measurement, i.e. during the progress of the temperature program. An amorphous sample which crystallizes during the heating procedure therefore produces an exothermic peak in the heating phase. Depending on the number and type of the phase transitions that take place during the progress of the temperature program, a number of exothermic and endothermic peaks occur, wherein the glass transition temperature is discernable as a step and not as a peak. The procedure usually uses a temperature program composed of a heating-cooling-heating cycle. This temperature program first equilibrates the sample to a preset starting temperature for from 2 to 5 min. After this first equilibration phase, the sample is heated at a uniform heating rate up to a preset first target temperature. A heating rate of 10° C./min. is usually used. At the first target temperature, the sample is again equilibrated for from 2 to 5 min., and is then cooled at a constant cooling rate down to a preset second target temperature. A cooling rate of 10° C./min. is usually used. At the second target temperature, the sample is again equilibrated for from 2 to 5 min., and is then heated at a uniform heating rate up to a preset third target temperature at which the sample is maintained for from 2 to 5 min. before the measurement is terminated. The heating rate used is usually the same as in the first heating phase, e.g. 10° C./min. The first and third target temperature can be identical or different, and the starting temperature and the second target temperature can likewise be identical or different.

In another embodiment of the invention, in a DSC diagram of the polymer composition that was measured in a heating-cooling-heating cycle beginning at a starting temperature of 15° C. with target temperatures 220° C.-15° C.-260° C. with heating and cooling rates that are respectively 10° C./min and equilibration times of 5 min at each target temperature, an exothermic peak in the cooling phase, in particular in the second target temperature, occurs in the temperature range from 80° C. to 120° C., preferably from 90° C. to 110° C., in the cooling phase.

In another embodiment of the invention, in a DSC diagram of the polymer composition that was measured in a heating-cooling-heating cycle beginning at a starting temperature of 15° C. with target temperatures 220° C.-15° C.-260° C. with heating and cooling rates that are respectively 10° C./min and equilibration times of 5 min at each target temperature, an endothermic peak in the second heating phase occurs at temperatures above 200° C., preferably above 210° C., more preferably above 215° C. The endothermic peak above 200° C. can also occur in the first heating phase.

In a preferred embodiment of the invention, another endothermic peak occurs at temperatures from 140° C. to 190° C. in the first, the second, or both heating phases.

The polymer composition of the invention can also comprise other components alongside the main components PLLA, PDLA, polyester, and organic or inorganic filler: in particular other polymers and/or conventional additives, for example processing aids, plasticizers, stabilizers, and/or flame retardants.

In particular, the polymer composition of the invention can comprise polycaprolactone. Addition of polycaprolactone can influence the mechanical properties of the polymer composition advantageously.

In a preferred embodiment of the invention, the water content of the polymer composition is less than 0.1% by weight, in particular less than 0.05% by weight, or 0.04% by weight, based in each case on the total weight of the polymer composition. Practical experiments have shown that water contents of less than 0.1% by weight can reduce undesired degradation of the polymer composition of the invention during subsequent processing.

The invention also provides processes which can give the polymer compositions described above.

The processes of the invention include in principle the following steps; the individual steps here can be carried out simultaneously or in succession and in any desired sequence and frequency:

a. producing a mixture comprising, based on the total weight of the mixture, at least the following components:
  i. from 15 to 70% by weight of PLLA,
  ii. from 0.1 to 15% by weight of PDLA,
  iii. from 5 to 40% by weight of polyester,
  iv. from 5 to 40% by weight of organic or inorganic filler;
b. homogenizing the mixture with introduction of thermal and/or mechanical energy.

Preferably, the steps are carried out in the sequence stated above.

The process of the invention envisages that the mixture is homogenized. The homogenization can be achieved by any desired measures familiar to the person skilled in the art in the field of plastics technology. It is preferable that the mixture is homogenized by dispersion, stirring, kneading, and/or extrusion. In a preferred embodiment of the invention, shear forces act on the mixture during homogenization. Suitable production processes for PDLA/PLLA mixtures which can also be applied analogously to the production of the polymeric material of the invention are described by way of example in EP 2 116 575 A1.

In a preferred embodiment of the invention, the mixture is heated during homogenization (e.g. in an extruder or in a melt kneader), preferably to a temperature of from 60° C. to 250° C., in particular from 90° C. to 200° C.

Polyester that has proven to be particularly suitable for the process of the invention is a statistical copolyester based on at least adipic and/or sebacic acid.

The information provided above in relation to the components of the polymer composition is preferably equally applicable to the components of the process of the invention.

In a preferred embodiment of the process of the invention, the water content of the polymer composition is adjusted to less than 0.1% by weight, in particular less than 0.05% by weight, or 0.04% by weight, based in each case on the total weight of the polymer composition. Water contents stated here are based on the material obtained after homogenization, in particular the material emerging from the extruder. Water content is determined by collecting a sample of the homogenized material in a sealable vessel in the form of melt directly after homogenization (i.e. typically immediately after discharge from the extruder), and sealing said vessel so that it is airtight. It is necessary here to ensure that homogenized material fills the vessel to the greatest possible extent, in order that air inclusion in the vessel is minimized. The sealed vessel is cooled and then opened, a sample is removed, and water content is determined by Karl-Fischer titration.

The adjustment of water content is preferably achieved by drying during homogenization. The drying procedure can by way of example involve devolatilization of the mixture/melt, advantageously by withdrawing water vapor during homogenization/extrusion.

The invention moreover provides processes which can give molded parts, films, or fibers made of the polymer compositions described above.

The process of the invention for producing molded parts in principle includes the following steps:
  a. introducing a polymer composition described above into a mold;
  b. molding of the molded part; and
  c. removing the molded part from the mold.

These steps together form a cycle which is usually carried out within a certain time, the cycle time, and which can be repeated as desired. It has proven to be advantageous here that the mold into which the polymer composition is introduced in step a. of the process for producing molded parts, films, or fibers is heated to from 30 to 130° C., preferably from 30 to 100° C., and more preferably from 45 to 85° C., and is kept in essence at this temperature during the process. Products produced with one of the polymer compositions described above and by the abovementioned process crystallize rapidly, and the high percentage of crystallization is sufficient to give said products an increased heat deflection temperature, and also to permit use of said products at temperatures above the glass transition temperature of PLA. Use of appropriate mold temperatures here improves the crystallization rate in a way that permits removal of the molded parts from the mold after a shorter time, without deformation.

For reasons of economics and process technology, it has proven advantageous to carry out the process for producing molded parts within a cycle time of at most seconds, preferably at most 45 seconds, more preferably at most 30 seconds. This increases the production capacity and cost-effectiveness of the process.

The polymer compositions of the invention are suitable for a very wide variety of purposes. In particular, the compositions are suitable for producing molded parts, films, or fibers. The rapid crystallization makes the compositions particularly suitable for producing molded parts.

Accordingly, the invention also provides molded parts, films, and fibers produced from the polymer compositions of the invention.

The description provided above regarding to heat deflection temperature, biodegradability, and biobased carbon content of the polymer composition is also equally applicable to the molded parts of the invention. In an advantageous embodiment of the invention the molded parts, films, or fibers resist heat deflection in accordance with DIN EN ISO 75, method B up to 55° C., preferably up to 65° C., more preferably up to 70° C., still more preferably up to 75° C., still more preferably up to 80° C., more preferably up to 85° C., still more preferably up to 90° C., even more preferably up to 95° C., and/or are biodegradable in accordance with EN 13432, preferably being fully biodegradable, and/or comprise at least 50% of biobased carbon in accordance with ASTM 6866.

The high heat deflection temperature of molded parts made of the polymer composition of the invention gives them excellent suitability as containers or capsules for coffee in coffee-preparation systems. This particularly preferred embodiment of the molded parts of the invention is described in more detail below with reference to the following drawings.

Figure 1:
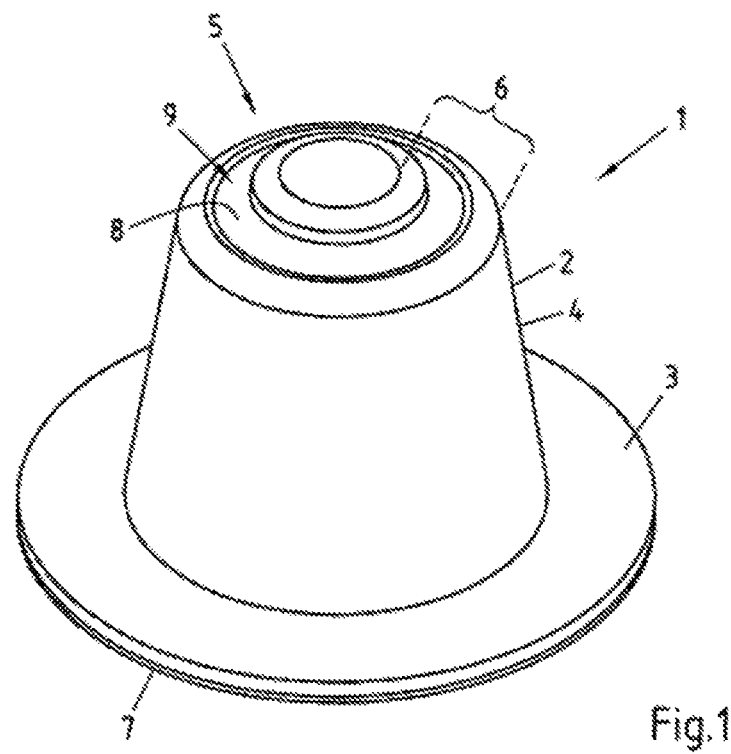
FIG. 1 is a diagram of a particularly preferred embodiment of the molded parts of the invention in plan view.

FIG. 1 is a plan view of a particularly preferred embodiment 1 of the molded parts according to the invention, comprising a frustoconical body 2 with a rim 3 and a side wall 4, and with an inlet wall 5, where the inlet wall 5 can comprise a flat or convex part 6, and with a lower added wall 7 which seals the rim 3, where the flat or convex portion 6 comprises a recessed or relief structure 8, where this recessed or relief structure 8 facilitates the penetration of said structure by blades belonging to the injection equipment, and occupies an area 9 which is in essence circular and the diameter of which is defined via the diameter of the blades, the arrangement of the latter likewise being circular.

Figure 2:
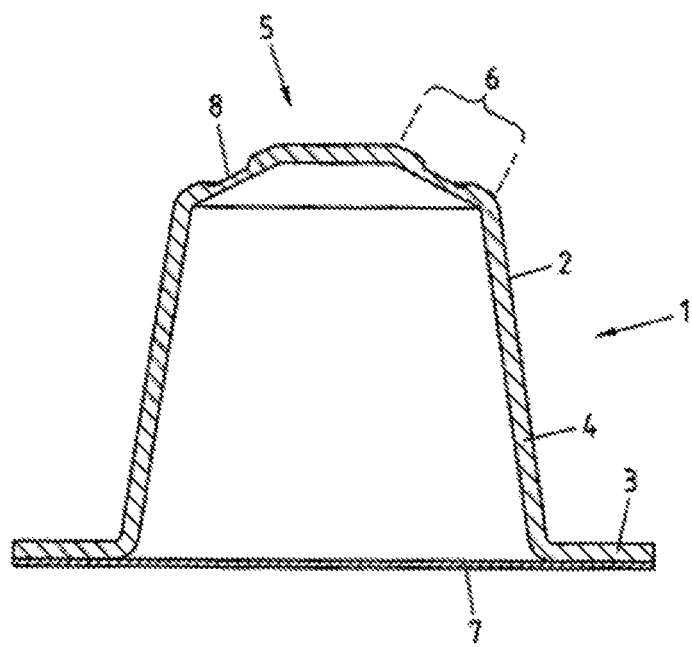
FIG. 2 is a diagram of a particularly preferred embodiment of the molded parts of the invention in cross section.

FIG. 2 is a cross section of a particularly preferred embodiment 1 of the molded parts of the invention, comprising a frustoconical body 2 with a rim 3 and a side wall 4, and with an inlet wall 5, where the inlet wall 5 can comprise a flat or convex part 6, and with a lower added wall 7 which seals the rim 3, where the flat or convex portion 6 comprises a recessed or relief structure 8, where this recessed or relief structure 8 facilitates the penetration of said structure by blades belonging to the injection equipment, and occupies an area which is in essence circular and the diameter of which is defined via the diameter of the blades, the arrangement of the latter likewise being circular.

In an embodiment of the molded parts of the invention that is more preferred, the lower added wall 7 seals the rim 3 of the capsule in a manner that is in essence gastight. This embodiment has the advantage that gastight packaging extends the shelf life of oxidizable substances present in the capsule.

In an embodiment of the molded parts of the invention that is still more preferred, the lower added wall 7 is biodegradable in accordance with EN 13432, preferably fully biodegradable, so that the entirety of this embodiment of the molded parts of the invention is biodegradable.

Films of the invention can be blown films, flat films, or cast films. Preferred film thicknesses are from 0.012 to 0.1 mm for blown films of the invention, from 0.15 to 0.5 mm for flat films of the invention, and from 0.01 to 0.5 mm for cast films of the invention.

The examples below are intended to provide further explanation of the principle of the invention.

The following materials were used for the comparative and inventive examples: polylactic acid, PLA (INGEO 2003D, NATUREWORKS); poly(butylene adipate-co-terephthalate), PBAT (ECOFLEX F Blend C 1201, BASF); calcium carbonate (HYDROCARB, OMYA); PLLA (SYNTERRA PLLA 1510, SYNBRA); PDLA (SYNTERRA PDLA 1010, SYNBRA).

EXAMPLE 1 (COMPARATIVE EXAMPLE)

The following formulation was compounded by a Werner & Pfleiderer (COPERION) ZSK 40 twin-screw extruder (corotating), screw diameter 40 mm, L/D=42 (metered proportions in percentage by mass):

Formulation A:
59.4% by weight of PLA
22.9% by weight of PBAT
17.7% by weight of $CaCO_3$ The compounding parameters here were as follows:

TABLE 1

| ZSK 40 temperature profile | | | | | | | | |
|---|---|---|---|---|---|---|---|---|
| Zone 1 | Zone 2 | Zone 3 | Zone 4 | Zone 5 | Zone 6 | Zone 7 | Zone 8 | Nozzle |
| 25° C. | 170° C. | 170° C. | 170° C. | 170° C. | 170° C. | 170° C. | 170° C. | 168° C. |

Figure 3:
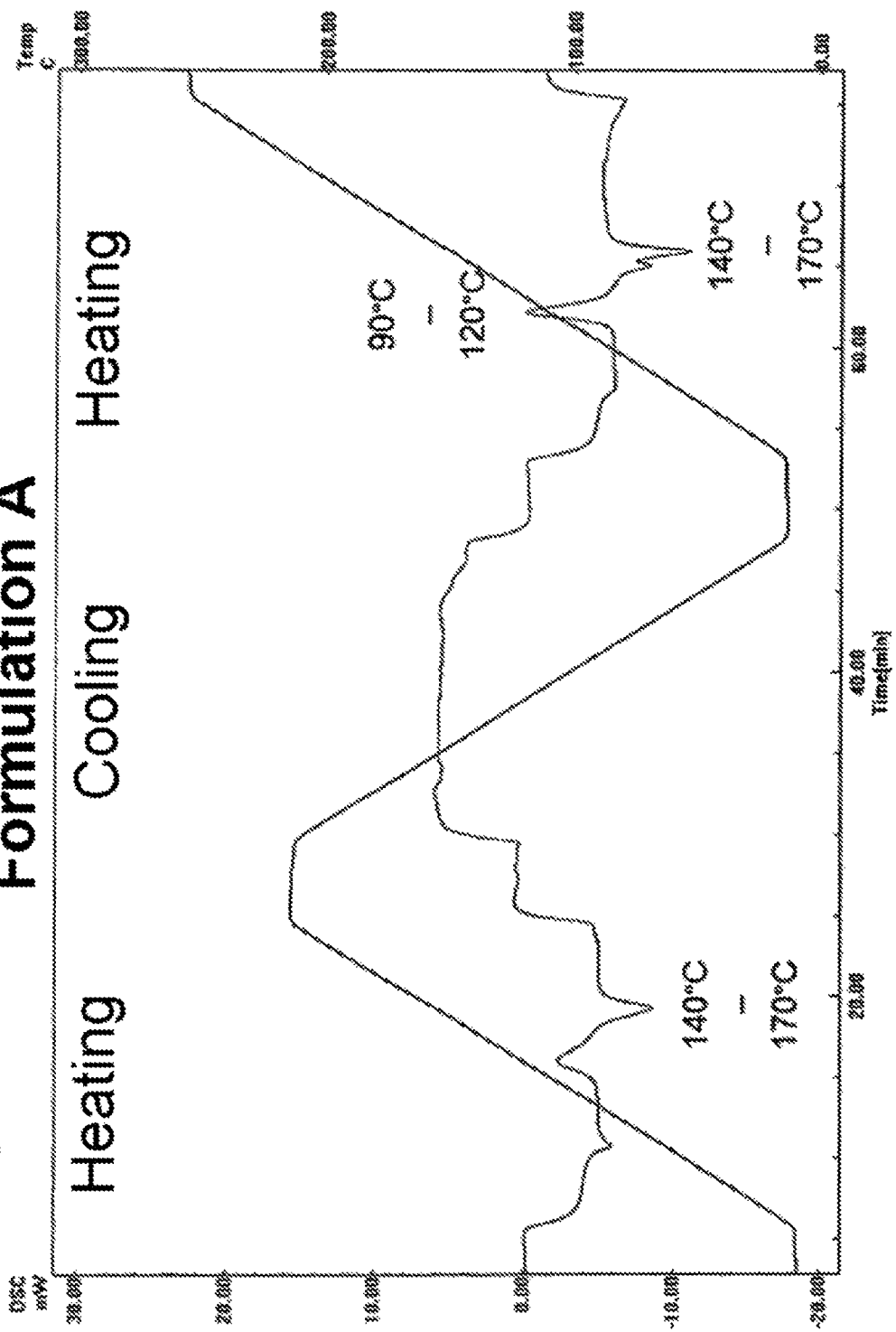
FIG. 3 is a DSC diagram of formulation A from example 1 (comparative example).

Melt temperature on discharge from die: 165° C.
Rotation rate: 180 $min^{-1}$
Throughput: 40 kg/h
Devolatilization: no FIG. 3 shows a DSC diagram of formulation A. Noticeable features in the DSC diagram in FIG. 3 are the absence of peaks in the cooling phase toward the second target temperature and the absence of peaks above 200° C.

The pellets were processed in an ARBURG ALLROUNDER 270 M injection-molding system to give test samples.

The processing parameters set here were as follows:

TABLE 2

| Processing parameters for injection molding | | | |
|---|---|---|---|
| Zone 1 | Zone 2 | Zone 3 | Zone 4 |
| 25° C. | 180° C. | 180° C. | 180° C. |

Mold temperature: 55° C.
Cycle time: 25 s

The resultant test samples featured low resistance to heat deflection at temperatures above 55° C.

Mechanical properties determined on the test samples after storage in the ambient atmosphere at room temperature for 24 hours were as follows:

TABLE 3

| Mechanical properties of test samples after 24 h | | | | | | |
|---|---|---|---|---|---|---|
| E-Modulus [GPa] EN ISO 527 | Tensile strength [MPa] EN ISO 527 | Tensile strength at strain [%] EN ISO 527 | Tensile stress at break [MPa] EN ISO 527 | Impact resistance at 23° C. [kJ/m$^2$] EN ISO 179/1 | Flexural strength [MPa] EN ISO 178 | Flexural modulus [GPa] EN ISO 178 |
| 2.4 | 28 | 2 | 34 | 140 | 60 | 2.5 |

EXAMPLE 2

The following formulation was compounded by a Werner & Pfleiderer (COPERION) ZSK 40 twin-screw extruder (corotating), screw diameter 40 mm, L/D=42 (metered proportions in percentage by mass):

Formulation B:
53.5% by weight of PLLA
5.9% by weight of PDLA
22.9% by weight of PBAT
17.7% by weight of $CaCO_3$ The compounding parameters here were as follows:

TABLE 4

| ZSK 40 temperature profile | | | | | | | | |
|---|---|---|---|---|---|---|---|---|
| Zone 1 | Zone 2 | Zone 3 | Zone 4 | Zone 5 | Zone 6 | Zone 7 | Zone 8 | Nozzle |
| 25° C. | 170° C. | 170° C. | 170° C. | 170° C. | 170° C. | 170° C. | 169° C. | 167° C. |

Figure 4:
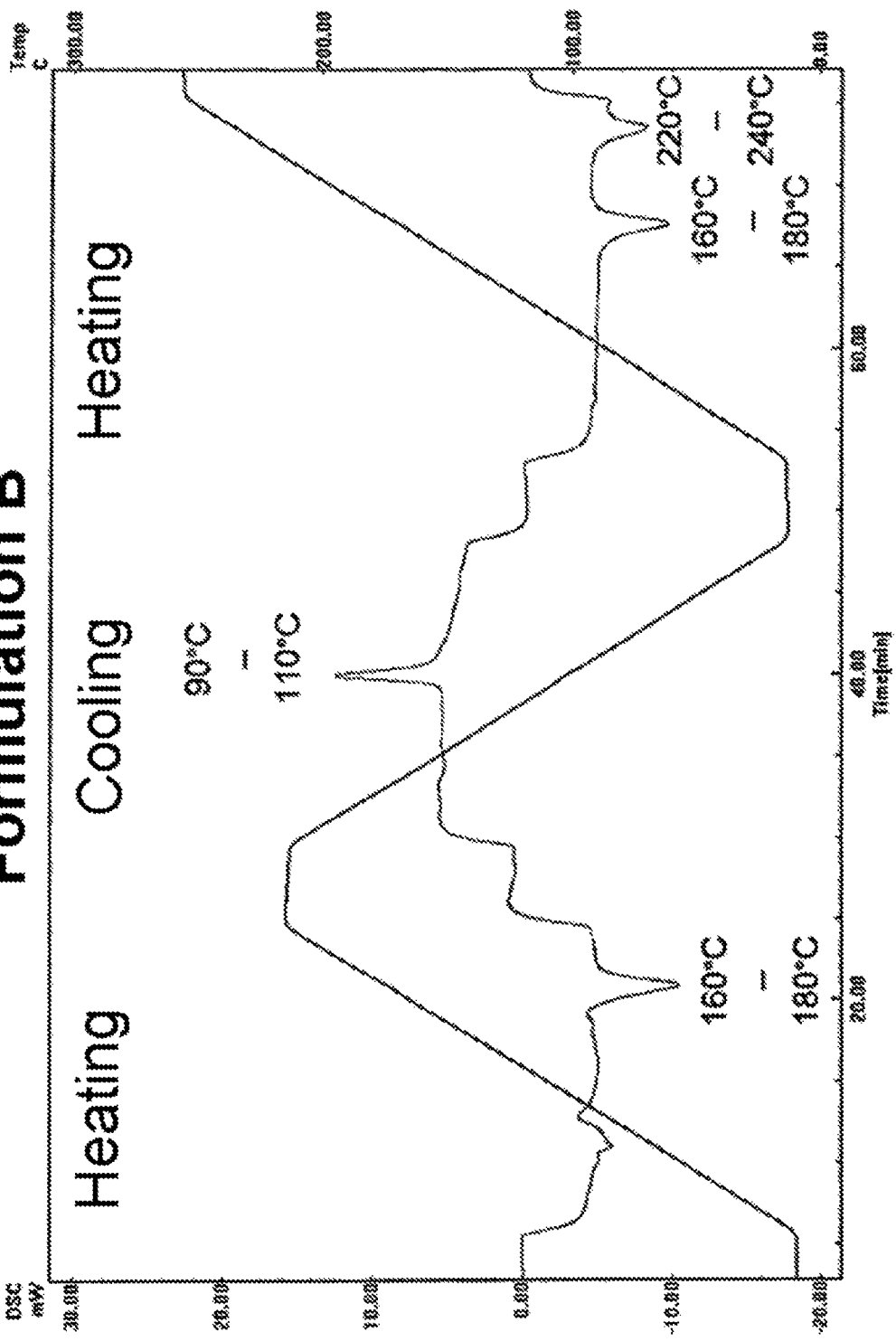
FIG. 4 is a DSC diagram of formulation B from example 2.

Melt temperature on discharge from nozzle: 165° C.
Rotation rate: 185 $min^1$
Throughput: 41 kg/h
Devolatilization: no FIG. 4 shows a DSC diagram of formulation B. Noticeable features in the DSC diagram of formulation B in FIG. 4 are the exothermic peak in the cooling phase toward the second target temperature (at about 40 min.) in the temperature range from 90 to 110° C., and also the endothermic peak in the second heating phase (at about 74 min.) in the temperature range from 220 to 240° C.

The pellets were processed in an ARBURG ALLROUNDER 270 M injection-molding system to give test samples.

The processing parameters set here were as follows:

TABLE 5

| Processing parameters for injection molding | | | |
|---|---|---|---|
| Zone 1 | Zone 2 | Zone 3 | Zone 4 |
| 25° C. | 180° C. | 180° C. | 180° C. |

Mold temperature: 55° C.
Cycle time: 20 s

The resultant test samples featured increased resistance to heat deflection at temperatures above 55° C. and up to 95° C.

Mechanical properties determined on the test samples after storage in the ambient atmosphere at room temperature for 24 hours were as follows:

TABLE 6

Mechanical properties of test samples after 24 h

| E-Modulus [GPa] EN ISO 527 | Tensile strength [MPa] EN ISO 527 | Tensile strength at strain [%] EN ISO 527 | Tensile stress at break [MPa] EN ISO 527 | Impact resistance at 23° C. [kJ/m$^2$] EN ISO 179/1 | Flexural strength [MPa] EN ISO 178 | Flexural modulus [GPa] EN ISO 178 |
|---|---|---|---|---|---|---|
| 2.4 | 31 | 2 | 30 | 80 | 53 | 2.5 |

When the results from the two compositions, summarized in tables 3 and 6, and also in the DSC diagrams in FIGS. 3 and 4, are compared, noticeable features are the significantly better thermal properties of formulation B, seen especially in the DSC diagram in an exothermic crystallization peak in the cooling phase in the temperature range from 90° C. to 110° C., and in a higher melting point in the temperature range from 220° C. to 240° C. These two peaks are not present in the DSC plot of formulation A, and indicate slower crystallization and lack of formation of stereo-complexes of PLLA and PDLA. In agreement with the DSC results, formulation A has distinctly higher impact resistance, believed to result from a lower degree of crystallization in the test sample of formulation A. Despite the higher degree of crystallization in the test sample of formulation B, and the improved thermal properties resulting therefrom, molded parts made of formulation B have very good mechanical properties, some of which are actually slightly better than those of formulation B, as can be seen by way of example from the increased tensile strength.

The invention has been described here by way of example with reference to inventive examples. It is self-evident here that the invention is not restricted to the inventive examples described. Many different possible variations and modifications are available to the person skilled in the art within the scope of the invention, and in particular the scope of protection provided by the invention is defined via the claims below.

What is claimed is:

1. A polymer composition comprising, based on the total weight of the polymer composition, the following components:
   a. from 15 to 70% by weight of poly(L-lactic acid) (PLLA) containing at least 90% of L-lactic acid monomers,
   b. from 0.1 to 15% by weight of poly(D-lactic acid) (PDLA) containing at least 90% of D-lactic acid monomers, wherein the polymer composition comprises from 3% to 20% by weight of PDLA, based on the total quantity of PLLA and PDLA present in the polymer composition,
   c. from 5 to 40% by weight of polyester, and
   d. from 5 to 40% by weight of organic or inorganic filler selected from the group consisting of chalk, lime, calcium carbonate, aluminum oxide, magnesium oxide, dolomite, boron nitride, terbium oxide, cellulose, cyclodextrins, saccharin, thymine, uracil, orotic acid, cyanuric acid, flame retardants, and mixtures thereof,
   wherein the polymer composition comprises an amount of stereocomplexes of PLLA and PDLA and the PLLA has a degree of crystallization such that in a DSC diagram of the polymer composition, when measured in a heating-cooling-heating cycle beginning at 15° C. with target temperatures 220° C.−15° C.−260° C. with heating and cooling rates that are respectively 10° C./min and equilibration times of 5 min at each target temperature, an exothermic peak occurs in the cooling phase in the temperature range from 80° C. to 120° C.

2. The polymer composition as in claim 1, wherein the polymer composition comprises from 25 to 65% by weight of the PLLA based on the total weight of the polymer composition.

3. The polymer composition as in claim 1, wherein the polymer composition comprises from 5 to 35% by weight of the polyester, based on the total weight of the polymer composition.

4. The polymer composition as in claim 1, wherein the polymer composition comprises from 5 to 35% by weight of the organic or inorganic filler, based on the total weight of the polymer composition.

5. The polymer composition as in claim 1, wherein the polyester is a random copolyester based on at least one of adipic acid or sebacic acid.

6. The polymer composition as in claim 1, wherein the polyester is a statistical aliphatic-aromatic copolyester based on (i) 1,4-butanediol, (ii) adipic acid and/or sebacic acid, and (iii) terephthalic acid and/or terephthalic acid derivative.

7. The polymer composition as in claim 1, wherein the organic or inorganic filler is selected from the group consisting of chalk, lime, calcium carbonate, aluminum oxide, magnesium oxide, dolomite, boron nitride, terbium oxide, cellulose, and mixtures thereof.

8. The polymer composition as in claim 1, wherein the polymer composition comprises at least 40% of biobased carbon in accordance with ASTM 6866.

9. The polymer composition as in claim 1, wherein the polymer composition is biodegradable in accordance with EN 13432 or fully biodegradable.

10. The polymer composition as in claim 1, wherein in a DSC diagram of the polymer composition, that was measured in the heating-cooling-heating cycle beginning at 15° C. with the target temperatures 220° C.−15° C.−260° C. with the heating and cooling rates that are respectively 10° C./min and the equilibration times of 5 min at each target temperature, the exothermic peak occurs in the cooling phase in the temperature range from 90° C. to 110° C.

11. The polymer composition as in claim 1, wherein in the DSC diagram of the polymer composition, that was measured in the heating-cooling-heating cycle beginning at 15° C. with the target temperatures 220° C.−15° C.−260° C. with the heating and cooling rates that are respectively 10° C./min and the equilibration times of 5 min at each target temperature, an endothermic peak occurs in the second heating phase at temperatures above 200° C.

12. The polymer composition as in claim 11, wherein a further endothermic peak occurs at temperatures from 140° C. to 190° C. in the heating phases.

13. The polymer composition as in claim 1, wherein the polymer composition comprises from 35 to 60% by weight of the PLLA, based on the total weight of the polymer composition, and from 5% to 15% by weight of PDLA, based on the total quantity of the PLLA and PDLA present in the polymer composition.

14. The polymer composition as in claim 1, wherein the polymer composition comprises from 45 to 60% by weight of the PLLA, based on the total weight of the polymer composition, and from 7% to 13% by weight of PDLA, based on the total quantity of the PLLA and PDLA present in the polymer composition.

15. The polymer composition as in claim 1, wherein the composition resists heat deflection in accordance with DIN EN ISO 75 method B up to 55° C.

16. The polymer composition as in claim 1, wherein the composition resists heat deflection in accordance with DIN EN ISO 75 method B up to 80° C.

17. The polymer composition as in claim 1, wherein the composition resists heat deflection in accordance with DIN EN ISO 75 method B up to 85° C.

18. The polymer composition as in claim 1, wherein the composition resists heat deflection in accordance with DIN EN ISO 75 method B up to 90° C.

19. The polymer composition as in claim 1, wherein the composition resists heat deflection in accordance with DIN EN ISO 75 method B up to 95° C.

20. An article of manufacture selected from molded parts, films, or fibers comprising a polymer composition as in claim 1.

21. The article of manufacture as in claim 20, wherein the article of manufacture is a molded part that resists heat deflection in accordance with DIN EN ISO 75, method B up to 55° C., and/or is fully biodegradable in accordance with EN 13432, and/or comprises at least 50% of biobased carbon in accordance with ASTM 6866.

22. The article of manufacture as in claim 21, wherein the article of manufacture is a molded part that comprises a frustoconical body with a rim and a side wall, and with an inlet wall, where the inlet wall comprises a flat or convex part, and with a lower added wall which seals the rim, where the flat or convex portion comprises a recessed or relief structure, where this recessed or relief structure facilitates penetration of this structure by blades belonging to the injection equipment, and occupies an area which is essentially circular and the diameter of which is defined via the diameter of the blades, the arrangement of the latter being likewise circular.

23. The article of manufacture as in claim 22, wherein the lower added wall seals the rim in a manner that is in essence gastight.

24. The article of manufacture as in claim 22, wherein the lower added wall is biodegradable in accordance with EN 13432, or is fully biodegradable.

25. A polymer composition comprising poly(L-lactic acid) (PLLA) containing at least 90% of L-lactic acid monomers, poly(D-lactic acid) (PDLA) containing at least 90% of D-lactic acid monomers, a polyester, and an organic or inorganic filler selected from the group consisting of chalk, lime, calcium carbonate, aluminum oxide, magnesium oxide, dolomite, boron nitride, terbium oxide, cellulose, cyclodextrins, saccharin, thymine, uracil, orotic acid, cyanuric acid, flame retardants, and mixtures thereof, wherein the polymer composition comprises from 3% to 20% by weight of PDLA, based on the total quantity of the PLLA and PDLA components present in the polymer composition, wherein the polymer composition comprises an amount of stereocomplexes of PLLA and PDLA and a degree of crystallization of the PLLA such that in a DSC diagram of the polymer composition, when measured in a heating-cooling-heating cycle beginning at 15° C. with target temperatures 220° C.-15° C.-260° C. with heating and cooling rates that are respectively 10° C./min and equilibration times of 5 min at each target temperature, an exothermic peak occurs in the cooling phase in the temperature range from 80° C. to 120° C.

26. A polymer composition comprising poly(L-lactic acid) (PLLA) containing at least 90% of L-lactic acid monomers, poly(D-lactic acid) (PDLA) containing at least 90% of D-lactic acid monomers, a polyester, and an organic or inorganic filler selected from the group consisting of chalk, lime, calcium carbonate, aluminum oxide, magnesium oxide, dolomite, boron nitride, terbium oxide, cellulose, cyclodextrins, saccharin, thymine, uracil, orotic acid, cyanuric acid, flame retardants, and mixtures thereof, wherein the polymer composition comprises from 3% to 20% by weight of PDLA, based on the total quantity of the PLLA and PDLA components present in the polymer composition, wherein the polymer composition comprises an amount of stereocomplexes of PLLA and PDLA and a degree of crystallization of the PLLA such that in a DSC diagram of the polymer composition, when measured in a heating-cooling-heating cycle beginning at 15° C. with target temperatures 220° C.-15° C.-260° C. with heating and cooling rates that are respectively 10° C./min and equilibration times of 5 min at each target temperature, an endothermic peak occurs in the second heating phase at temperatures above 200° C.

27. The polymer composition as in claim 26, wherein in the DSC diagram of the polymer composition a further endothermic peak occurs at temperatures from 140° C. to 190° C. in the heating phases.

* * * * *